United States Patent
Eyal et al.

(10) Patent No.: US 11,271,959 B2
(45) Date of Patent: Mar. 8, 2022

(54) METHOD AND APPARATUS FOR COMBINING A FIREWALL AND A FORENSICS AGENT TO DETECT AND PREVENT MALICIOUS SOFTWARE ACTIVITY

(71) Applicant: CrowdStrike, Inc., Irvine, CA (US)

(72) Inventors: Karni Eyal, Kochav Yair (IL); Sagi Sheinfeld, Tel Aviv (IL); Zinar Yaron, Petah Tikva (IL)

(73) Assignee: CrowdStrike, Inc., Irvine, CA (US)

( * ) Notice: Subject to any disclaimer, the term of this patent is extended or adjusted under 35 U.S.C. 154(b) by 104 days.

(21) Appl. No.: 16/689,702

(22) Filed: Nov. 20, 2019

(65) Prior Publication Data
US 2021/0152585 A1    May 20, 2021

(51) Int. Cl.
*H04L 29/06* (2006.01)
*H04L 41/16* (2022.01)

(52) U.S. Cl.
CPC .......... *H04L 63/1425* (2013.01); *H04L 41/16* (2013.01); *H04L 63/0236* (2013.01); *H04L 63/10* (2013.01); *H04L 63/1466* (2013.01); *H04L 63/20* (2013.01)

(58) Field of Classification Search
CPC . H04L 63/1425; H04L 63/0236; H04L 63/10; H04L 63/1466; H04L 63/20
USPC .......................................................... 726/22
See application file for complete search history.

(56) References Cited

U.S. PATENT DOCUMENTS

| | | | |
|---|---|---|---|
| 2009/0164522 A1* | 6/2009 | Fahey | H04L 63/30 |
| 2016/0294773 A1* | 10/2016 | Yu | H04L 63/1425 |
| 2016/0359876 A1 | 12/2016 | Touboul et al. | |
| 2017/0223037 A1 | 8/2017 | Singh et al. | |
| 2018/0027017 A1* | 1/2018 | Touboul | G06F 21/554 |
| | | | 726/23 |
| 2021/0011999 A1* | 1/2021 | Bennett | G06F 16/1734 |

OTHER PUBLICATIONS

Extended European Search Report dated Mar. 19, 2021 for European Patent Application No. 20208964.5, 5 pages.

* cited by examiner

*Primary Examiner* — Longbit Chai
(74) *Attorney, Agent, or Firm* — Lee & Hayes, P.C.

(57) ABSTRACT

Methods and systems for detecting and preventing malicious software activity are presented. In one embodiment, a method is presented that includes monitoring network communications on a network. The method may also include detect a suspect network communication associated with a suspect network activity and, in response, determine an originating machine based on the suspect network activity. The method may further suspend network communications for the originating machine. A forensics software agent may then be selected based on the suspect network activity. Then, the forensics software agent may be deployed on the originating machine. After deployment, the forensics software agent may fetch computer forensics data from the originating machine. Once the computer forensics data is fetched, a response action may be selected and executed based on said computer forensics data.

20 Claims, 5 Drawing Sheets

METHOD AND APPARATUS FOR COMBINING A FIREWALL AND A FORENSICS AGENT TO DETECT AND PREVENT MALICIOUS SOFTWARE ACTIVITY

BACKGROUND

Computers within computer networks may perform certain activities on the network. For instance, these computers or other machines on the network may request access to other computers within the network and/or to a domain server on the network, or attempt to send sensitive data across the network. As interconnected systems and networks become ever more popular, there exists a need to protect these computers within the computer network from malicious activity, including attempts to gain access to certain computers or files to which one does not have authorization.

In order to securely monitor these actions, a system may include a module or unit that monitors the network to identify and prevent any malicious activity. Prior systems aimed towards this problem may make use of a firewall or endpoint detection and response ("EDR"). A firewall is typically a software application or a dedicated device through which network data flows, allowing passage of or blocking certain network communications based on that particular firewall's predetermined policy. An EDR is typically a software application that accurately records and reports actions and activities that occur on a local device, such as certain file operations, network communications, and cross process operations in order to identify malicious activity.

SUMMARY

The present disclosure presents a new and innovative method and system for detecting and preventing malicious software activity on a network. In a first aspect, a method is provided that includes monitoring network communications on a network, detecting a suspect network communication of the network communications associated with a suspect network activity, and determining an originating machine based on the suspect network activity. The method may further include suspending network communications for the originating machine, selecting a forensics software agent based on the suspect network activity, and deploying the forensics software agent on the originating machine. The method may still further include fetching, by the forensics software agent, computer forensics data from the originating machine, and selecting a response action based on the computer forensics data.

In a second aspect according to the first aspect, deploying the forensics software agent comprises determining whether the forensics software agent is installed on the originating machine. Responsive to determining the forensics software agent is installed on the origination machine, deploying the forensics software agent may further comprise sending a command to the originating machine to trigger the forensics software agent. Responsive to determining the forensics software agent is not installed on the origination machine, deploying the forensics software agent may further comprise providing the forensics software agent to the originating machine and triggering the forensics software agent.

In a third aspect according to any of the first and second aspects, deploying the forensics software agent comprises determining whether the forensics software agent is installed on the originating machine, responsive to determining the forensics software agent is installed on the origination machine, sending a command to the originating machine to trigger the forensics software agent, and responsive to determining the forensics software agent is not installed on the origination machine, providing the forensics software agent to the originating machine, installing the forensics software agent on the originating machine, and triggering the forensics software agent.

In a fourth aspect according to any of the first through third aspects, fetching the computer forensics data from the originating machine comprises identifying at least one suspicious packet based on the suspect network activity, determining a plurality of computer data types based on the at least one suspicious packet and the suspect network activity, and fetching the computer forensics data from the originating machine corresponding to the plurality of computer data types.

In a fifth aspect according to the fourth aspect, the plurality of computer data types comprises one or more data types selected from the group consisting of (i) process lists, (ii) open files and network connections, (iii) stack traces associated with computing processes, (iv) stack traces associated with processing threads, (v) physical evidence, (vi) binary image of files stored on the machine, (vii) browser history, (viii) user identities, and (ix) user permissions.

In a sixth aspect according to any of the first through fifth aspects, monitoring network communications comprises correlating monitored network activities with other sources of information.

In a seventh aspect according to the sixth aspect, correlating the monitored network activities with other sources of information comprises identifying a protocol query by a machine in the network communications and querying a corresponding protocol for an associated machine identifier based on the protocol query. Correlating the monitored network activities with other sources of information may further comprise querying a database for a matching malicious machine identifier based on the associated machine identifier and, responsive to identifying a matching malicious machine identifier, correlating the protocol query with the matching malicious machine identifier.

In an eighth aspect according to the seventh aspect, detecting a suspect network communication associated with a suspect network activity comprises identifying, as the suspect network activity, the DNS query.

In a ninth aspect according to any of the first through eighth aspects, detecting the suspect network activity within the network traffic comprises receiving a notification of a network activity from a network device and determining the network activity is a suspect network activity based on one or more network activity rules.

In a tenth aspect according to the ninth aspect, the notification of a network activity includes a first machine identifier for the originating machine, a second machine identifier for a recipient machine, and all data associated with the suspect network communication and suspect network activity.

In an eleventh aspect according to any of the first through tenth aspects, the one or more network activity rules include at least one rule selected from the group consisting of (i) a static rule, (ii) an automatically-generated rule generated by a software process, and (iii) a fuzzy logic rule including at least one fuzzy logic condition.

In a twelfth aspect according to any of the first through eleventh aspects, the network device is any one of (i) a firewall, (ii) a proxy sniffer, and (iii) a network sniffer.

In a thirteenth aspect according to any of the first through thirteenth aspects, the suspect network activity includes any of (i) a brute force password attack attempt, (ii) an authentication anomaly, and (iii) a protocol data exfiltration attempt.

In a fourteenth aspect according to any of the first through thirteenth aspects, the method further comprises deleting the forensics software agent from the originating machine.

In a fifteenth aspect according to any of the first through fourteenth aspects, the forensics software agent is an agent that is deleted upon completion of at least one associated task.

In a sixteenth aspect according to any of the first through fifteenth aspects, determining a forensics software agent to deploy based on the suspect network activity comprises selecting, from a plurality of forensics agents, a forensics software agent configured to collect data associated with the suspect network activity.

In a seventeenth aspect according to any of the first through sixteenth aspects, determining the response action based on the collection of computer forensics data comprises providing, from the forensics software agent, the collection of computer forensics data to a policy management unit, analyzing, by the policy management unit, the collection of computer forensics data, and determining, based on the analyzed collection of computer forensics and one or more forensics rules, the response action.

In an eighteenth aspect according to the seventeenth aspect, the method further includes providing, to the policy management unit, a collection of network device data and adding the collection of network device data into the collection of computer forensics data.

In a nineteenth aspect according to any of the first through eighteenth aspects, the response action is any of a network response, an endpoint response, or a network configuration change.

In a twentieth aspect according to any of the first through nineteenth aspects, the response action is any of terminating a process execution, detecting and isolating at least one binary file, detecting and isolating at least one executable, terminating a user session, or terminating a network connection.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Computer networks and the computing devices and data found on these networks are under constant risk of attack from malicious actors. These networks are susceptible to attacks, such as attempting to gain access to files or information without authorization, removing such data, and initiating or engaging in any other attack that may be performed over a network. In order to combat the onslaught of network attacks, prior solutions were created to protect networks. Certain prior solutions provide network security through the use of firewalls, EDR, intrusion detection systems, port scanners, network sniffers, or vulnerability scanners. Although these prior solutions provide some security, these solutions have distinct disadvantages. For example, EDR software is typically deployed and maintained across all machines within a network, and may constantly gather and record data. Such a deployment requires substantial computing resources, requiring maintenance, software upgrades, and constant monitoring of each instance of the EDR software. Furthermore, the EDR software typically only collects generic data, and is not capable of specialized responses to particular malicious activity performed on a machine within the network. For example, a typical firewall installation blocks a network communication from completing, but may be unable to affect the software process that initiated the communication. As a result, certain information regarding the communication and intended results may be lost. Other systems may only scan and detect issues, consuming a large amount of resources without being able to take action and defend against attacks.

Therefore, there exists a need for a system to identify malicious activities that may occur on a network and take necessary actions or respond in such a way to eliminate the threat. Furthermore, this system must be efficient, have specialized responses, and take steps to ensure that as much possible regarding a particular malicious event is recorded and analyzed.

Figure 1:
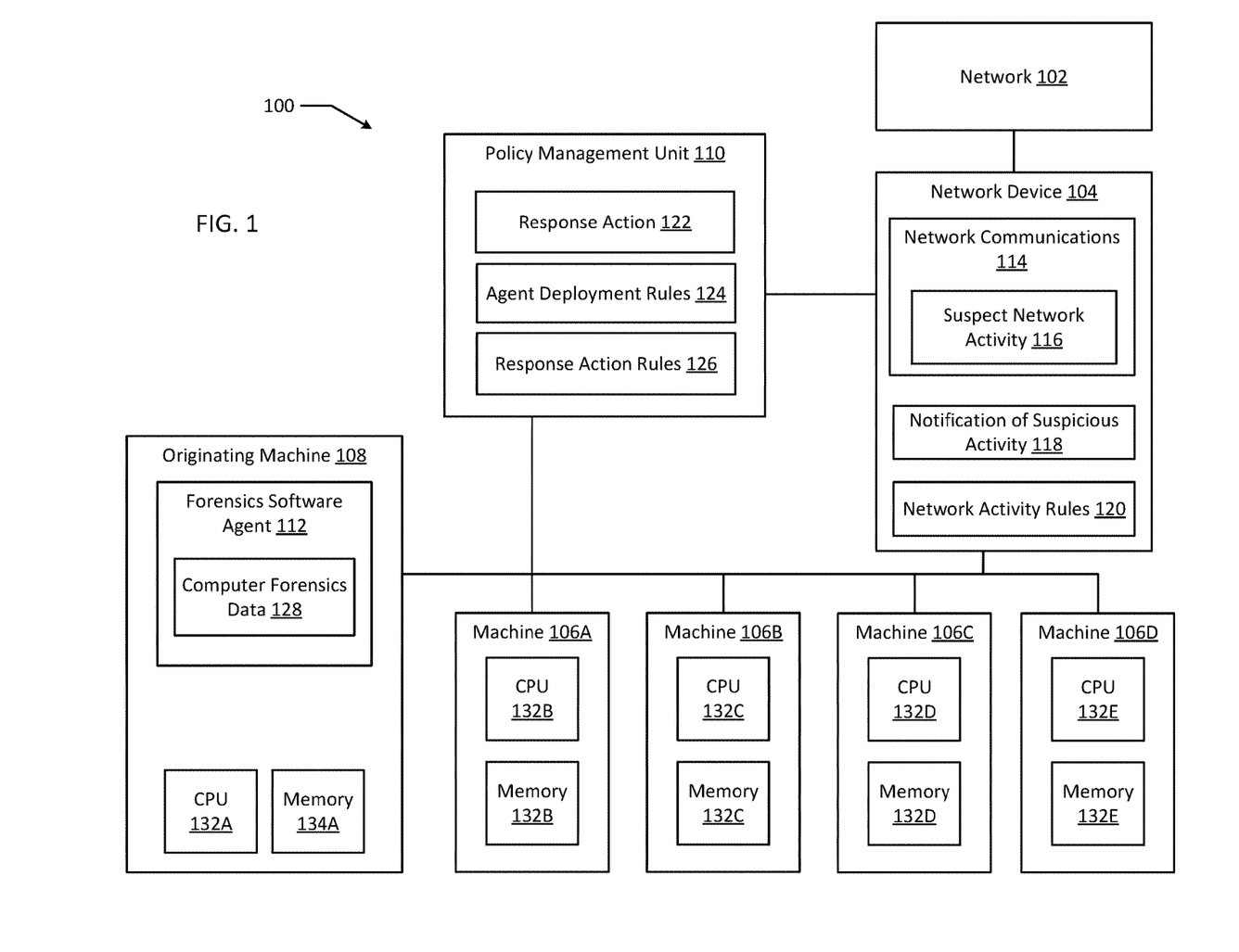
FIG. 1 illustrates a system according to an exemplary embodiment of the present disclosure.

FIG. 1 illustrates a system 100 according to an exemplary embodiment of the present disclosure. The system 100 may be configured to detect and prevent malicious software activity. The system 100 includes a network 102 and a network device 104 connected to the network 102. The network device 104 is connected to a policy management unit 110, a plurality of machines 106A-D, and an originating machine 108. The plurality of machines 106A-D and the originating machine 108 are also connected to the policy management unit 110.

The originating machine 108 and the plurality of machines 106A-D may each include their own respective CPU 132A-E and memory 134A-E. These machines may perform actions that require access to the network 102, such as domain name system ("DNS") queries, transmission of files, authentication requests, electronic mailing actions, or any other actions typically conducted through the use of a network and machine connected to the network.

The network device 104 may include a dedicated hardware device or software application. Furthermore, this network device 104 may include one or more of a firewall, a proxy sniffer, network sniffer or any other solution that may continuously monitor traffic on the network 102. As such, the network device 104 may monitor all network traffic and network communications 114 initiated by the machines 106A-D and the originating machine 108 or network communications 114 intended to be received by the machines 106A-D and the originating machine 108. For example, the network device 104 may monitor a network communication 114 from originating machine 108 in which the originating machine 108 is attempting to send a collection of data onto the network 102. While the network device 104 monitors the network communications 114, it may detect a suspect network activity 116 and associate this suspect network activity 116 with the corresponding network communication 114, identifying this communication as a suspect network communication. For example, the network communications 114 may contain information that the originating machine 108 is attempting to complete a process executing a brute force attack in attempt to access certain information. In such an attack, a malicious software or user makes repeated authentication attempts with a selection of different passwords until the correct password is discovered, granting access to the content that required such authentication. In such a case, the network communications 114 may display a rapid succession of failed authentication attempts emanating from the originating machine 108 indicating a suspect network activity 116. Other examples of a suspect network activity 116 may include authentication anomalies, such as Kerberos golden ticket attack or remote code execution attacks on NT LAN Manager protocol, data exfiltration, man in the middle attacks, or any other attacks that may route information to suspected malicious entities.

The network device 104 may detect and flag a suspect network activity 116 based on a collection of network activity rules 120. These network activity rules 120 may comprise any of a static rule that is predetermined, an automatically-generated rule generated by a software process, a fuzzy logic rule including at least one fuzzy logic condition, or any modifiable rule that updates based on prior detections. Should the network device 104 detect a suspect network activity 116, the network device 104 may determine an originating machine 108 from which the suspect network activity 116 originated. For example, as described above, the network device 102 may receive a network communication 114 that, based on the network activity rules 120, indicates that an attempted brute force attack is in progress from the originating machine 108. Note that in an example system other than that illustrated in FIG. 1, any machine 106A-D may be determined as the originating machine 108.

Once a suspect network activity 116 has been detected and an originating machine 108 determined, the network device 104 may suspend network communications for the originating machine 108. In doing so, the network device 104 may keep the software process initiated within the originating machine 108 that caused the suspect network activity 116 in a frozen or locked state, which may prevent further changes to data related to the software process and may thereby preserve associated data artifacts that may have otherwise been lost. In certain implementations, the software process may time out and exit if network communications to the software process are suspended for too long (e.g., more than 1-5 minutes). In such implementations, it may therefore be necessary to identify associated data artifacts before the software process times out. Some example data artifacts include command line information, memory maps and memory dumps, stack traces, hashes and full binaries of the executable file, credentials for, network behavior, and the user identify that initiated such a process. In addition, after detecting the suspect network activity 116 and determining the originating machine 108, the network device 104 may transmit a notification of suspicious activity 118 to the policy management unit 110. This notification of suspicious activity may include all information on the suspected network activity 116, including all information from the associated suspected network communications 114, as well as information regarding the originating machine 108. The decision to transmit the notification of suspicious activity 116, as well as the content of the transmission, may also be determined by the network device 104 based on the network activity rules 120.

The policy management unit 110 may include an external hardware device, or a software implemented on a device. In some examples, the policy management unit 110 may be included in the network device 104. Upon receiving a notification of suspicious activity 118, the policy management unit 110 may determine whether to send or deploy a forensics software agent 112 to the originating machine 108. Such a decision may be based on a collection of agent deployment rules 124. These agent deployment rules 124 may comprise any of a static rule that is predetermined, an automatically-generated rule generated by a software process, a fuzzy logic rule including at least one fuzzy logic condition, or any modifiable rule that updates based on prior detections. For example, the policy management unit 110 may be configured to always deploy a forensics software agent 112 to the originating machine 108 upon reception of a notification of suspicious activity 118. In another example, the policy management unit 110 may only deploy the forensics software agent 112 under certain circumstances. For example, there may be a situation in which a network experiences multiple failed authentication attempts. In such a situation, the management unit 110 may determine that a forensics software agent 112 should not be deployed unless a certain threshold of a number of failed attempts has been surpassed because deploying a forensics collection agent for every failed attempt would be costly. Continuing this example, there may be other circumstances and factors for deploying the agent, such as when a lower number of failed authentication attempts are experienced, but these attempts coincide with other suspicious activity. This other suspicious activity may include an instance wherein the machine that is generating failed authentication attempts is the same machine that generated past failed authentication attempts.

Furthermore, based on the agent deployment rules 124, the policy management unit 110 may select a forensics software agent 112 to be deployed to the originating machine 108 based on the notification of suspicious activity 118, and therefore also based on the suspect network activity 116. For example, the policy management unit 110 may store or include a plurality of forensics software agents 112 and may select and deploy a particular software agent when it is determined that a password brute force attack is being attempted, and may deploy a different software agent when it is determined that a file extraction attack is being attempted. In another example, when an authentication anomaly has occurred, the policy management unit 110 may deploy a forensics software agent 112 that is configured to inspect the authentication process, such as the lssas.exe process for Windows® operating systems, and to verify one or both of the identity of the process that initiated the authentication anomaly and/or a user account on whose behalf the authentication anomaly is performed. In a different example, when an HTTP exfiltration has occurred, the policy management unit 110 may deploy a forensics software agent 112 that is configured to inspect web browser data and verify which process initiated the exfiltration activity.

The forensics software agent 112 may include a software program intended to run on the originating machine 108. The forensics software agent 112 may fetch computer forensics data 128 from the originating machine 108. This computer forensics data 128 may include data and information relevant to the suspect network activity 116 that is not included in the network communications 114 received by the network device 104. Once the computer forensics data 128 is collected, the forensics software agent 122 may transmit the computer forensics data 128 to the policy management unit 110 for analysis. Note that in some examples, the forensics software agent 112 may conduct analysis on the computer forensics data 128.

When determining and selecting a response action, the policy management unit 110 may conduct and analyze the computer forensics data 128 based on a set of response action rules 126. These response action rules 126 may comprise any of a static rule that is predetermined, an automatically-generated rule generated by a software process, a fuzzy logic rule including at least one fuzzy logic condition, or any modifiable rule that updates based on prior attack detections. These response action rules 126 may include attack specific rules, rules related to a general category of attacks, or rules that take a holistic approach to analyzing the computer forensics data 128. For example, the policy management unit 110 may select a response action that includes one of terminating a process execution, detecting and isolating any binary files and/or executables files that are the cause of the suspect network activity 116, terminating the user session on the originating machine 108, or terminating the network connection of the originating machine 108. The policy management unit 110 may then execute the selected response action 122.

After the selected response action 122 is executed, the forensics software agent 112 may be deleted from the originating machine 108. The forensics software agent 112 may cause such a deletion itself, or may act under instruction from the policy management unit 110.

Figure 2:
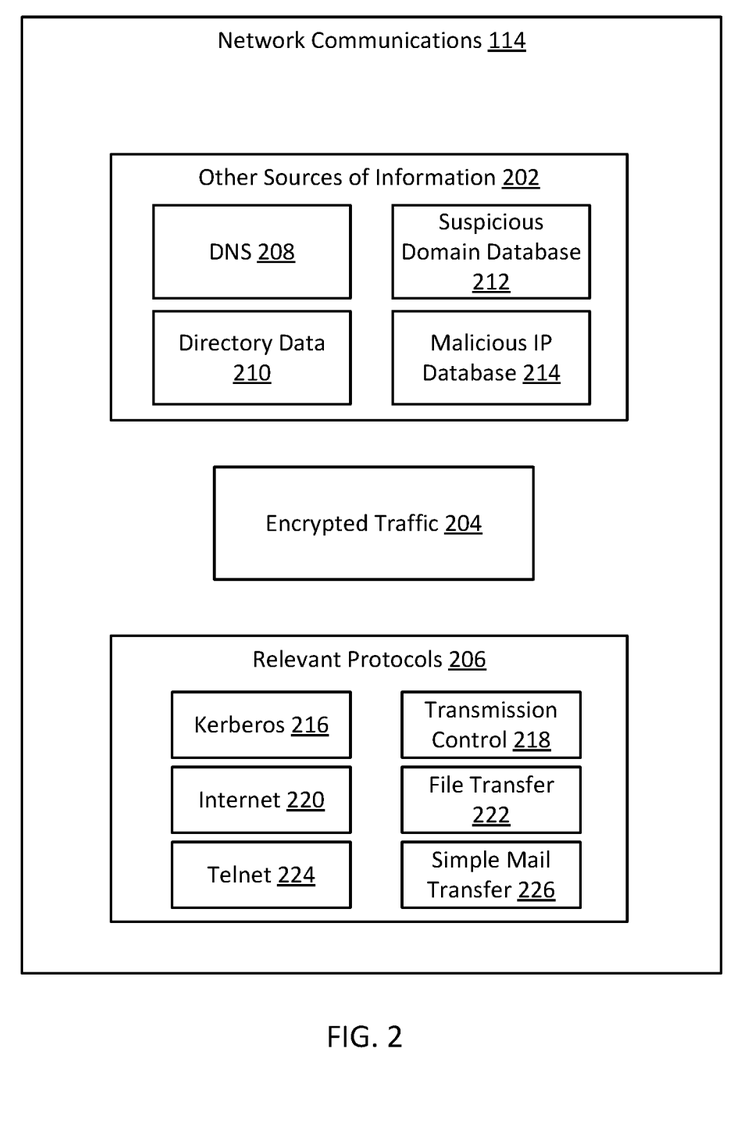
FIG. 2 illustrates network communications according to an exemplary embodiment of the present disclosure.

FIG. 2 illustrates an exemplary implementation of the network communications 114 according to an exemplary embodiment of the present disclosure. The network communications 114 may depict specific types of information included within the authentication request 114 received and monitored by the network device 104. The network communications 114 may include other sources of information 202, encrypted traffic 204, or relevant protocols 206. The network device 104 may make use of these specific types of information when detecting a suspect network communication associated with a suspect network activity 116.

When monitoring the network communications 114 on a network 102, the network device may parse relevant protocols 206. These relevant protocols 206 may include the Kerberos 206 protocol, standard internet 220 protocol, the Telnet 224 protocol, transmission control 218 protocol, file transfer 222 protocol, or simple mail transfer 226 protocol. Furthermore, these relevant protocols 206 may include any other protocols through which machines 106A-D communicate over a network 102. As the machines 106A-D and originating machine 108 typically rely on such protocols to communicate with one another as well as with the network 102, the network device 104 can analyze the network communications 114 containing the protocols to determine the requested action. As an example, the network device 104 may find a certain network communication 114 and determine that it complies with the DNS protocol. After determining that the network communication 114 complies with the DNS protocol, the network device 104 may parse the communication, according to the DNS protocol, to determine the requested network activity. In this case, the requested network activity may be a DNS query.

Furthermore, when monitoring the network traffic and thus the network communications 114 of the network 102, the network device may correlate some network activities with other sources of information 202. These other sources of information 202 may include a DNS 208, a directory data 210, a suspicious domain database 212, a malicious internet protocol ("IP") database 214, or any other database or protocol to which the network device 102 may have access. When correlating network activities with other sources of information 202, the network device 104 may first identify the network activity requested by an originating machine 108. For example, as discussed above, the network device may identify a DNS query by the originating machine 108 in the network communications 114. In response, the network device may query the DNS 202 for an associated machine identifier based on the DNS query, without immediately passing the results of the query to the originating machine 108. Once the associated machine identifier based on the DNS query has been determined, the network device 104 may query a database, such as a malicious IP database 214 or suspicious domain database 212, to search for a matching machine identifier. If the machine device 104 identifies a matching machine identifier, such as a matching IP address, that is within the malicious machine identifier database, such as the malicious IP database 214, the network device 104 may correlate the network activity with the matching machine identifier. Continuing the above example, the network activity may then be correlated with the malicious IP address as entered on the malicious IP database 214.

The network device 104 may further associate the network activity that has been correlated with the matching malicious machine identifier. For example, when detecting a suspect network communication associated with a suspect network activity 116, the network device 104 may identify, as a suspect network activity 116, the network activity that has been correlated with a matching malicious machine identifier. In the above example, the DNS query has been correlated to a malicious IP address as entered on the malicious IP database 214. Due to this correlation, the DNS query as received from the originating machine 108 will be determined to be a suspect network activity 116.

In addition, the network device 104 may decipher any encrypted traffic 204 within the network communications 114 in order to better monitor the network communications 114 of the network 102. In some cases, the network device 104 may be provided the cipher, decryption key, or secret key that is used to encrypt and decrypt the data transmitted from the machines 106A-D and the originating machine 108. As such, the network device may decrypt these communications to better monitor and detect suspicious activity. In an example, if the network device 104 is not able to decrypt the transmission as it was not provided the corresponding secret key or unable to decipher the encrypted traffic, the network device 102 may identify the encrypted traffic as a suspect network activity 116. Alternatively, the network device 104 may inspect other properties that disclosed even when the traffic is encrypted. Some non-limiting examples of these inspections may include determining whether a large portion of encrypted data is being sent or received, whether the TCP/IP headers show non-conventional communication, and whether the packet destination is determined as a known malicious entity database.

Figure 3:
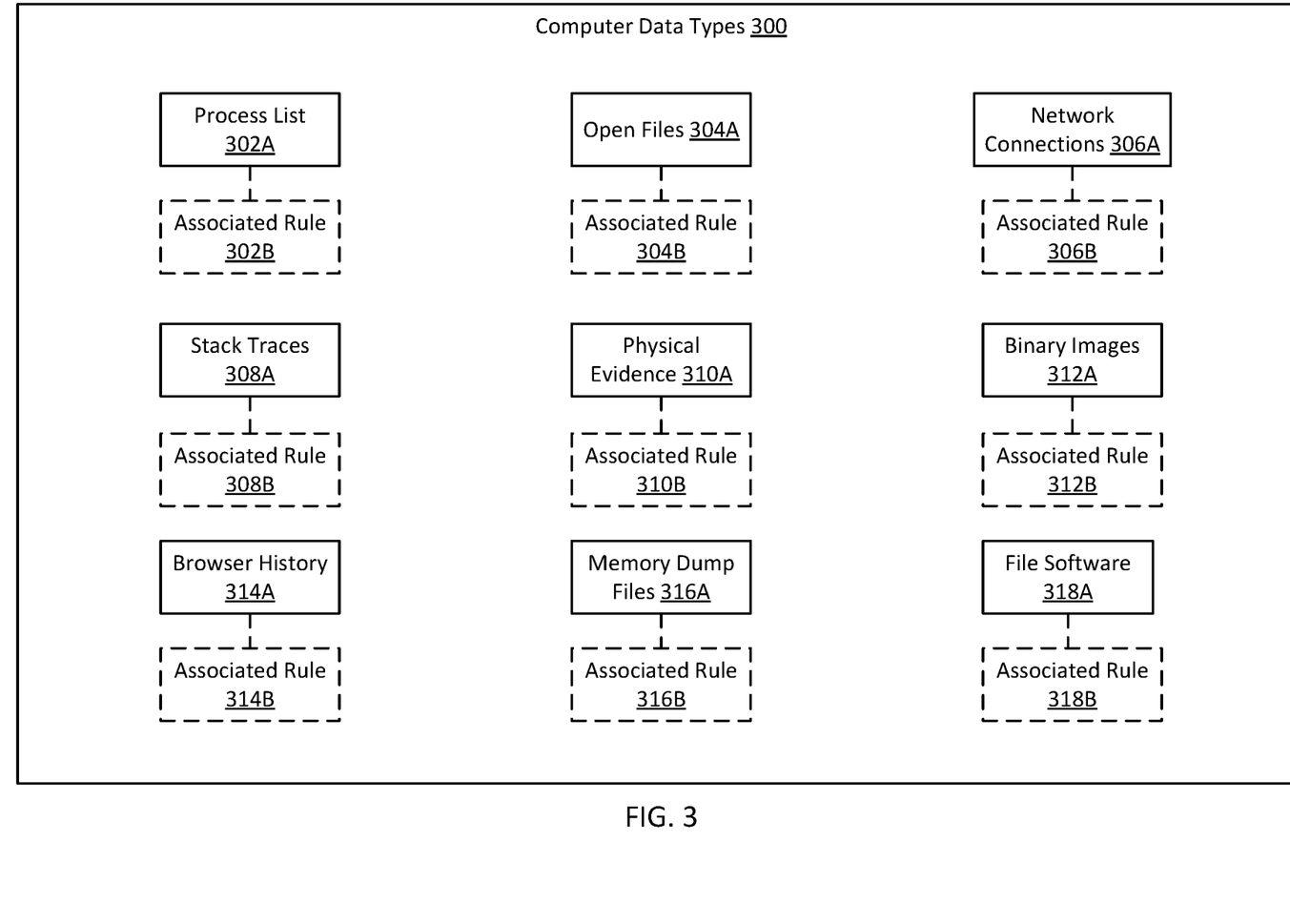
FIG. 3 illustrates computer data types according to an exemplary embodiment of the present disclosure.

FIG. 3 illustrates an exemplary implementation of the computer data types 300 according to an exemplary embodiment of the present disclosure. When fetching computer forensics data 128, the forensics software agent 112 may first identify at least one suspicious packet based on the suspect network activity 116. For example, when a simple email activity has been flagged as a suspect network activity 116 due at least in part to the receiver's IP address appearing on a malicious IP database 214, the forensics software agent 112 may identify one or every packet associated with the suspect network activity 116 due to the packet header containing the malicious receiver's IP address.

The forensics software agent 112 may also determine a plurality of computer data types 300 based on the identified suspicious packet(s) and the suspect network activity 116. These computer data types 300 may include any one or more of a process list 302A, open files 304A of the originating machine 108, network connections 306A associated with the originating machine 108, stack traces 308A associated with an executed program, physical evidence 310A, such as photo, video, audio, or fingerprint data associated with the originating machine 108, binary images 312A, an originating machine's 108 browser history 314A, memory dump files 316A, file software 318A, or any other data types that may be associated with the network communications 114 of the originating machine 108.

Continuing the prior example, when the forensics software agent 112 has identified a suspicious packet that is associated with a suspect network activity 116 including an email message, the forensics software agent 112 may determine a plurality of computer data types 300 comprising open files 304A, network connections 306A, browser history 314A, and memory dump files 316A. The forensics software agent 112 may then fetch a network data from the originating machine 108 corresponding to the plurality of computer types 300 and identify this network data as the computer forensics data 128. In another example, a suspect network activity 116 may comprise an authentication anomaly, such as a Kerberos golden ticket attack. In this case, the forensics software agent 112 may determine a plurality of computer data types 300 comprising memory dump files 316A, file software 318A, network connections 306A and stack traces 308A. Such memory types may assist in identifying a user initiating the attack, identifying software tools used to launch the attack, and any other anomalies in the authentication activity.

After fetching the computer forensics data 128, the forensics software agent 112 may provide the computer forensics data 128 to the policy management unit 110 in order to determine and select a response action 122. Note that in some embodiments, the forensics software agent 112 may select the response action 122 instead of the policy management unit 110. To select the response action 122, the policy management unit 110 may utilize a set of response action rules 126 to analyze the computer forensics data 128. This set of response action rules 126 may comprise at least associated rules 302B-318B, each of which correspond to one of the computer data types 302A-318A. For example, associated rule 318B may contain instructions to end all file software 318A that may be carrying out a certain process, such as carrying out a brute force attack.

Figure 4:
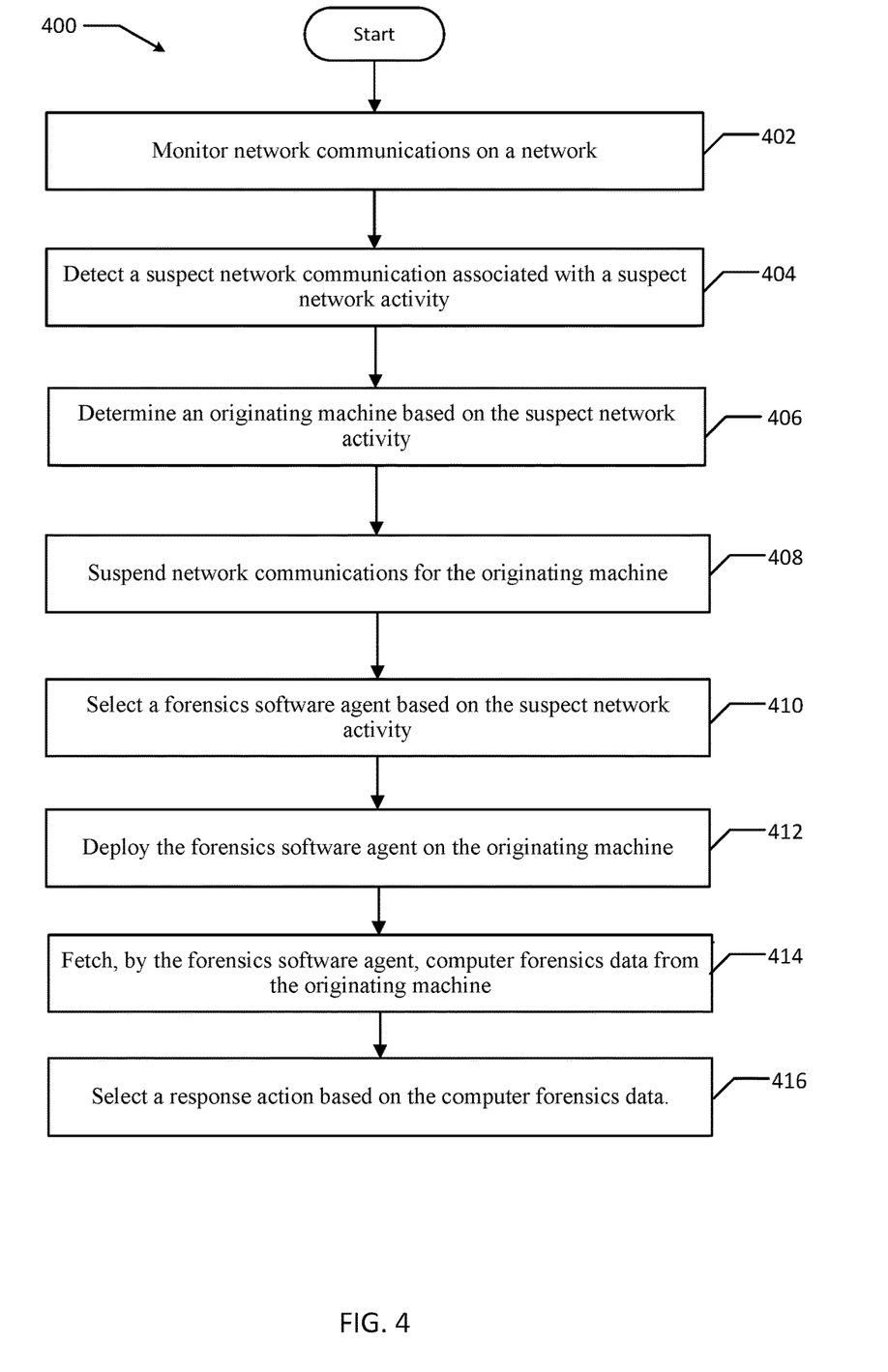
FIG. 4 illustrates a method according to an exemplary embodiment of the present disclosure.

FIG. 4 illustrates a method 400 according to an exemplary embodiment of the present disclosure. The method 400 may be performed to detect and prevent malicious software activity within a network 102, based on network communications 114 that originated from any machines 106A-D or originating machine 108. The method 400 may be implemented on a computer system, such as the computer system 100. In particular, the method 400 may be performed at least in part by one or more of the network device 104, the machines 106A-D, the originating machine 108, the policy management unit 110, or the forensics agent 112. The method 400 may also be implemented by a set of instructions stored on a computer readable medium that, when executed by a processor, cause the computer system to perform the method 400. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional. Furthermore, the method 400 may be combined, at least in part, with one or more additional methods described in the present disclosure. For example, the method 400 may be combined, at least in part, with the method 500.

The method 400 begins with the network device 104 monitoring the network communications 114 on a network 102 (block 402). As explained above, network device 104 may monitor the network communications 114 based on a set of network activity rules 120 or by correlating network activities with other sources of information and thereby detect a suspect network communication associated with a suspect network activity 116 (block 404). For example, the originating machine 108 may request to send data to a known malicious IP address. The network device 104 may identify such a request as a suspect network activity 116 based on one of the network activity rules 120 that identifies all attempts to send data to a malicious IP address as suspect network communications.

The network device 104 may determine an originating machine 108 based on the suspect network activity 116 (block 406). For example, the data collected within the suspect network communication and attributed to the suspect network activity 116 may typically contain an IP address of the machine responsible for the communication. In such instances, the IP address would indicate that the originating machine 108 as seen in FIG. 1 is the originating machine. Note that in other examples, any one of the machines 106A-D may be designated as the originating machine 108 based on the origin of other network communications 114. The network machine 104 may then suspend the network communications 114 for the originating machine 108 (block 408). For example, once the originating machine 108 has been determined after a suspect network activity 116 involving sending data to a known malicious IP address has been detected, the network device 104 may suspend the communications by the originating 108 to ensure no further data is passed along. In addition, in another example, the network device 104 may suspend the related process associated with that suspect network activity 116. For example, rather than immediately terminating a process involved in sending the data, the network device may cause the process to freeze and stop processing, preserving possible data artifacts that may otherwise be lost. Such a freeze may be implemented because the process initiated network traffic has an open UDP/TCP connection. The network device 104 may hold back the request packet or response packet, preventing the forwarding of said packet, and thereby maintain the open UDP/TCP connection, allowing inspection of the data artifacts that may have been lost should the packet have been forwarded and the connection closed.

The policy management unit 110 may select a forensics software agent 112 based on the suspect network activity 116 (block 410). For example, as discussed above, the network device 104 may have provided a notification of suspicious activity 118 to the policy management unit 110. This notification of suspicious activity 118 may have comprised information about the suspect network activity 116, including all data received through the network communications 114 associated with the suspected network activity 116. Based on this notification of suspicious activity 118 and the suspect network activity 116, the policy management unit 110 may determine both whether to deploy a forensics software agent 112 and which forensics software agent 112 to deploy. In some examples, the policy management unit 110 may have a different forensics software agent 112 available for different types of suspect network activities. For example, there may be a forensics software agent 112 for each of an authentication anomaly, a file transfer anomaly, etc. and a general forensics software agent 112 for any suspect network activity 116 outside of specifically defined categories.

In addition, the policy management unit 110 may deploy the forensics software agent 112 on the originating machine 108 (block 412). Once deployed, the forensics software agent 112 may fetch computer forensics data 128 from the originating machine 108 (block 414). For example, the forensics software may be running on the originating machine 108 after the policy management unit 110 decided the forensics software agent 112 must be deployed due to a suspect network activity 116 involving transmitting data to a known malicious IP address. The forensics software agent 112 may then fetch all data on the originating machine 108 that relates to this suspect network activity 116, which may include data regarding other transmissions to this malicious IP address, the programs used transmit the data, the past and current versions of any files to be transmitted, and any communications regarding the files or data to be transmitted.

The policy management unit 110 or, in some cases, the forensics software agent 112, may then select a response action 122 based on the computer forensics data 128 (block 416). For example, once the forensics computer data 128 regarding a malicious file transfer has been fetched, the forensics software agent 112 may provide this data 128 to the policy management unit 110. The policy management unit 110 may then analyze the forensics computer data 128 according to an auto-generated set of response action rules 126. This auto-generated set of rules may have been generated by a machine-learning module, heuristics, artificial intelligence, or any other method by which rules may automatically be generated. In additional or alternative implementations, analysis of the computer forensics data 128 may compared with the suspect network activity 116 to identify discrepancies (e.g., discrepancies in user identifiers, permissions, accessed directories, directories for which access is requested). In such implementations, the response action rules 126 may further specify particular discrepancies that warrant response actions 122.

Then, based on these response action rules 126, the policy management unit 110 may select a response action 122. Continuing the above example, the computer forensics data 128 may indicate that a user, through the originating machine 108, has sent multiple files from a certain restricted directory to the known malicious IP address in the past. One of the response action rules 126 may indicate that, under such circumstances, the user's access to the restricted directory be suspended, as well as all further communications to the known malicious IP address be blocked. Furthermore, the response action 122 may include these actions, as well as an immediate termination of all processes related to the suspect network activity 116 that are currently running on the originating machine 108. Some other example categories of response actions 122 may include network response, an endpoint response, or a network configuration change. Additionally, other examples of a response action 122 may include detecting and isolating at least one binary file, detecting and isolating at least one executable, terminating a user session, or terminating a network connection.

Figure 5:
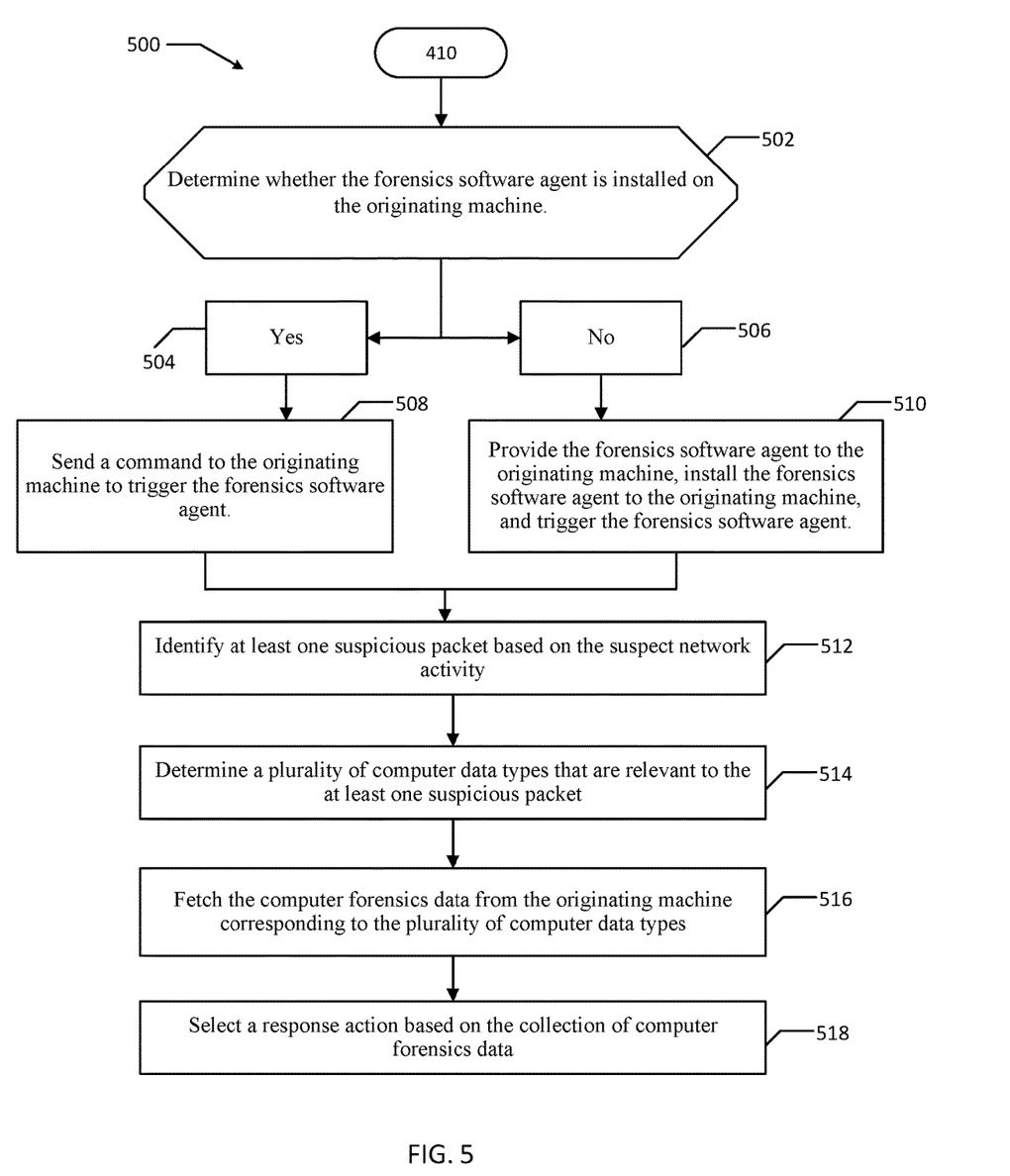
FIG. 5 illustrates a method according to an exemplary embodiment of the present disclosure.

FIG. 5 illustrates a method 500 according to an exemplary embodiment of the present disclosure. The method 500 may be performed to detect and prevent malicious software from carrying out suspect network activity 116 by ensuring a forensics software agent 112 is properly deployed to an originating machine 108. In particular, as depicted, the method 500 may be performed after the policy management unit 110 selects a forensics software agent 112 based on the suspect network activity 116 at block 410 of the method 400. The method 400 may be implemented on a computer system, such as the computer system 100. In particular, the method 500 may be performed at least in part by one or more of the network device 104, the machines 106A-D, the originating machine 108, the policy management unit 110, or the forensics agent 112. The method 500 may also be implemented by a set of instructions stored on a computer readable medium that, when executed by a processor, cause the computer system to perform the method. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional. Furthermore, the method 500 may be combined, at least in part, with one or more additional methods described in the present disclosure. For example, the method 500 may be combined, at least in part, with the method 400.

The method 500 begins with the policy management unit 110 determining whether the selected forensics software agent 112 is already installed on the originating machine 108 (block 502). For example, such a determination may be carried out by consulting a database stored on the policy management unit 110 detailing previously installed agents and their locations, or, in another example, sending a query to the originating machine 108 requesting information regarding the selected forensics software agent's 112 install status.

If the policy management unit 110 determines that the selected forensics software agent 112 is already installed on the originating machine 108 (block 504), the policy management unit 110 may send a command to the originating machine to trigger the forensics software agent 112 (block 508). For example, the selected software agent 112 may comprise a deletion mechanism that deletes the selected software agent 112 from the originating machine 108 after task completion, but only after a certain amount of time has passed. This amount of time could be immediately, five minutes, five days, or any amount of time sufficient for that particular forensics software agent 112. As such, as in the example, the forensics software agent 112, though a dissolvable agent, may already be installed on an originating machine 108 as the certain amount of time before deletion has not yet expired even though all prior tasks have been completed. Therefore, upon a determination that the forensics software agent 112 is to be deployed on the originating machine 108 yet again, the policy management unit 110 need only send a triggering command to deploy/initiate the forensics software agent 112. In another example, forensics software agent 112 may always be stored on certain machines 106A-D or the originating machine 108.

Should the policy management unit 110 determine that the selected forensics software agent 112 is not already installed on the originating machine 108 (block 506), the policy management unit 110 may provide the forensics software agent 112 to the originating machine 108, install the forensics software agent 112 to the originating machine 108, and trigger the forensics software agent 112 (block 510). For example, the originating machine 108 may never have been associated with a suspect network activity 116 in the past, and therefore no forensics software agent 112 may have been previously deployed to the machine. Alternatively, prior forensic software agents 112 may have been deployed to the originating machine 108, but may have deleted themselves or been deleted after completing their tasks or after a certain amount of time to deletion expired. As such, the policy unit 110 must provide the forensics agent 112 to the originating machine 108. Once transmitted or provided to the originating machine 108 by some other means, the forensics software agent 112 may be installed by the originating machine 108, or by the forensics software agent 112. Note that, although method 500 of FIG. 5 details that the forensics software agent 112 is to be installed to the originating machine 108, in other examples, the forensics software agent 112 may comprise an executable file that does not require installation and instead can be immediately executed. Once installed, the forensics software agent 112 may transmit an install status to the policy management unit 110, indicating installation has completed. The policy management unit 110 may then send a trigger to the forensics software agent, initiating the fetching process. In another example, the forensics software agent 112 may trigger itself upon completion of installation, or may trigger an executable without installation as soon as fully provided to the originating machine 108.

In another example, the policy management unit 110 may query whether there are other examples of EDR software present on the originating machine 108. This query may occur prior to or after determining whether the selected forensics software agent 112 is installed on the originating machine 108 (e.g., at or after block 502). In this example, a different EDR software other than the selected forensics software agent 112 may be detected. The policy management unit 110 may then determine whether the preinstalled different EDR software is suitable for the task at hand. If the policy management unit 110 determines the different EDR software may be used, the policy management unit 110 may send appropriate commands or API calls to the different EDR software to prompt the fetching of relevant forensics data.

Once triggered, the forensics software agent 112 may begin the fetching process. As detailed above, the forensics software agent 112 may identify at least one suspicious packet based on the suspect network activity 116 (block 512). For example, a suspect network activity 116 may have been detected in which the originating machine 108 was attempting to conduct an HTTP data exfiltration. Certain packets of network data associated with this attempt may be identified as suspicious, such as those packets that detail a malicious receiver IP address, or packets indicating that files intended to remain only within the local network or on a particular originating machine 108 are to be sent outside the local network. Based on these suspicious packets, the forensics software agent 112 may determine a plurality of computer data types 300 that are relevant to the at least one suspicious packet (block 514). For example, in the case of suspicious packets related to an HTTP data exfiltration, the determined computer data types 300 may include memory dump files 316A, stack traces 308A, file software 318A, browser history 314A, and open files 304A.

The forensics software agent 112 may then fetch the computer forensics data 128 from the originating machine 108 corresponding to the plurality of computer data types 300 (block 516). For example, if the determined computer data types 300 include memory dump files 316A, stack traces 308A, and browser history 314A, the forensics software agent 112 may collect data located on the originating machine 108 that effectively corresponds to these data types, including the originating machine's 108 dump files, its stack traces, and all browser history as stored on the originating machine 108.

In an alternative example, the forensics software agent 112 may be configured to, once deployed, collect a large amount of network data from the originating machine 108. For instance, once deployed, the forensics software agent 112 may collect and store, for a limited amount of time, all data related to the possible computer data types 300, regardless of the individual data types' 300 relationship to a particular suspicious activity. Then, certain samples of these collected data types 300 may be requested and provided based on their relevancy to the at least one suspicious packet. By collecting all data and storing the data temporarily, the forensics software agent 112 may monitor interfaces that may be otherwise ignored due to those interfaces typically being considered too computationally heavy or noisy. In summary, such alternative configurations may cause the forensics software agent 112 to collect and store, on a temporary basis, many or all types of network data that may be relevant to any suspicious network activity, and to provide these types of network data upon request.

Then, the forensics software agent 112 or the policy management unit 110 may determine a response action 122 based on the collection of computer forensics data 128 (block 518). As described above, the policy management unit 110 may be provided the computer forensics data 128 and analyze this data under a set of response action rules 126. In an example, the policy management unit 110 may add, to the computer forensics data 128, all data received in the original notification of suspicious activity 118 and all data associated with the suspect network activity 116 as received through the network communications 114. In doing so, the computer forensics data 128 will comprise data collected by both the forensics software agent 112 and the network device 104. As such, the policy management unit 110 may analyze this expanded set of computer forensics data 128 to determine the response action 122. The policy management unit 110 may then execute the response action 122, or cause the response action 122 to be executed by, for example, sending commands to the originating machine 108 or the network device 104.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
   monitoring, by a network device, network traffic between a plurality of machines and a network;
   detecting, by the network device, a suspect network communication, in the network traffic, associated with a suspect network activity;
   identifying, by the network device, an originating machine, of the plurality of machines, that sent the suspect network communication;
   suspending, by the network device, network communications for the originating machine;
   selecting, by a policy management unit associated with the network device, a forensics software agent to deploy on the originating machine, wherein:
      the policy management unit has a plurality of stored forensics software agents associated with different types of suspect network activities,
      the policy management unit selects the forensics software agent from among the plurality of stored forensics software agents, based on a type of the suspect network activity, and
      the forensics software agent selected by the policy management unit is configured to collect computer forensics data associated with the type of the suspect network activity;
   deploying, by the policy management unit, the forensics software agent on the originating machine by transmitting deployment data from the policy management unit to the originating machine;
   receiving, by the policy management unit, the computer forensics data collected by the forensics software agent from the originating machine; and
   selecting, by the policy management unit, a response action based on the computer forensics data.

2. The method of claim 1, wherein:
   deploying the forensics software agent comprises determining that the forensics software agent is installed on the originating machine, and
   the deployment data is a trigger command that is transmitted from the policy management unit to the originating machine, responsive to determining that the forensics software agent is installed on the originating machine, to trigger the forensics software agent.

3. The method of claim 1, wherein:
   deploying the forensics software agent comprises determining that the forensics software agent is not installed on the originating machine,
   the deployment data comprises an installation file or an executable file associated with the forensics software agent that is transmitted from the policy management unit to the originating machine, responsive to determining that the forensics software agent is not installed on the originating machine, and
   the deployment data triggers the forensics software agent to execute on the originating machine.

4. The method of claim 1, wherein the forensics software agent is configured to collect the computer forensics data from the originating machine by:
   identifying at least one suspicious packet, based on the suspect network activity;
   determining a plurality of computer data types, based on the at least one suspicious packet and the suspect network activity; and
   fetching the computer forensics data from the originating machine, based on the plurality of computer data types.

5. The method of claim 4, wherein the plurality of computer data types comprises one or more data types selected from the group consisting of (i) process lists, (ii) open files and network connections, (iii) stack traces associated with computing processes, (iv) stack traces associated with processing threads, (v) physical evidence, (vi) binary image of files stored on the originating machine, (vii) browser history, (viii) user identities, and (ix) user permissions.

6. The method of claim 1, wherein monitoring the network communications comprises correlating, by the network device, monitored network activities with other sources of information.

7. The method of claim 6, wherein correlating the monitored network activities with the other sources of information comprises:
   identifying, by the network device, a requested network activity, requested by the originating machine, in the network traffic;
   querying, by the network device, one of the other sources of information for an associated machine identifier, based on the requested network activity;
   querying, by the network device, a database for a matching malicious machine identifier, based on the associated machine identifier; and
   correlating, by the network device, the requested network activity with the matching malicious machine identifier.

8. The method of claim 7, wherein the requested network activity is a domain name system (DNS) query.

9. The method of claim 1, wherein the network device is configured to:
   determine that a network activity is the suspect network activity based on one or more network activity rules, and
   transmit a notification of the suspect network activity to the policy management unit.

10. The method of claim 9, wherein the notification of the suspect network activity includes a first machine identifier for the originating machine, a second machine identifier for a recipient machine, and data captured by the network device associated with the suspect network communication and the suspect network activity.

11. The method of claim 9, wherein the one or more network activity rules include at least one rule selected from the group consisting of (i) a static rule, (ii) an automatically-generated rule generated by a software process, and (iii) a fuzzy logic rule including at least one fuzzy logic condition.

12. The method of claim 1, wherein the network device is any one of (i) a firewall, (ii) a proxy sniffer, or (iii) a network sniffer.

13. The method of claim 1, wherein the suspect network activity includes any of (i) a brute force password attack attempt, (ii) an authentication anomaly, or (iii) a protocol data exfiltration attempt.

14. The method of claim 1, further comprising transmitting, by the policy management unit, a deletion instruction that causes the forensics software agent to delete itself from the originating machine.

15. The method of claim 1, wherein selecting the response action, based on the computer forensics data, comprises:
   analyzing, by the policy management unit, the computer forensics data; and
   determining, based on analyzing the computer forensics data and based on one or more forensics rules, the response action.

16. The method of claim 15 further comprising:
receiving, by the policy management unit and from the network device, a collection of network device data associated with the suspect network communication; and
adding, by the policy management unit, the collection of network device data into the computer forensics data.

17. The method of claim 1, wherein the response action is any of:
a network response,
an endpoint response,
a network configuration change,
terminating a process execution,
detecting and isolating at least one binary file,
detecting and isolating at least one executable,
terminating a user session, or
terminating a network connection.

18. One or more non-transitory computer-readable media storing computer-executable instructions for a policy management unit that, when executed by one or more processors, cause the one or more processors to perform operations comprising:
receiving, from a network device configured to monitor network traffic between a plurality of machines and a network, a notification of a suspect network activity, wherein the notification identifies an originating machine, of the plurality of machines, associated with the suspect network activity;
selecting a forensics software agent to deploy on the originating machine, wherein:
the policy management unit has a plurality of stored forensics software agents associated with different types of suspect network activities,
the forensics software agent is selected from among the plurality of stored forensics software agents, based on a type of the suspect network activity, and
the forensics software agent that is selected is configured to collect computer forensics data associated with the type of the suspect network activity;
deploying the forensics software agent on the originating machine, by transmitting deployment data from the policy management unit to the originating machine;
receiving the computer forensics data collected by the forensics software agent from the originating machine; and
selecting a response action, based on the computer forensics data.

19. The one or more non-transitory computer-readable media of claim 18, wherein:
deploying the forensics software agent comprises determining that the forensics software agent is not installed on the originating machine,
the deployment data comprises an installation file or an executable file associated with the forensics software agent that is transmitted from the policy management unit to the originating machine, responsive to determining that the forensics software agent is not installed on the originating machine, and
the deployment data triggers the forensics software agent to execute on the originating machine.

20. The one or more non-transitory computer-readable media of claim 18, wherein:
deploying the forensics software agent comprises determining that the forensics software agent is installed on the originating machine, and
the deployment data is a trigger command that is transmitted from the policy management unit to the originating machine, responsive to determining that the forensics software agent is installed on the originating machine, to trigger the forensics software agent.

\* \* \* \* \*